(12) United States Patent
Chapman et al.

(10) Patent No.: US 8,451,638 B2
(45) Date of Patent: May 28, 2013

(54) POWER CONVERTER WITH REVERSE RECOVERY AVOIDANCE

(75) Inventors: Patrick L. Chapman, Austin, TX (US); Trishan Esram, Urbana, IL (US)

(73) Assignee: SolarBridge Technologies, Inc., Austin, TX (US)

( * ) Notice: Subject to any disclaimer, the term of this patent is extended or adjusted under 35 U.S.C. 154(b) by 0 days.

(21) Appl. No.: 13/355,718

(22) Filed: Jan. 23, 2012

(65) Prior Publication Data

US 2012/0155128 A1 Jun. 21, 2012

Related U.S. Application Data

(63) Continuation of application No. 12/714,860, filed on Mar. 1, 2010, now Pat. No. 8,120,933.

(51) Int. Cl.
*H02H 7/122* (2006.01)

(52) U.S. Cl.
USPC ...................................... 363/56.01

(58) Field of Classification Search
None
See application file for complete search history.

(56) References Cited

U.S. PATENT DOCUMENTS

| | | | |
|---|---|---|---|
| 4,969,081 A | 11/1990 | Shekhawat et al. | |
| 6,909,620 B2 | 6/2005 | Park et al. | |
| 8,120,933 B2 * | 2/2012 | Chapman et al. | 363/56.01 |
| 2011/0013438 A1 | 1/2011 | Frisch et al. | |

OTHER PUBLICATIONS

Lai, R-S., et al, A PWM Method for Reduction of Switching Loss in a Full-Bridge Inverter, IEEE Transactions on Power Electronics, vol. 10, No. 3, May 1995, pp. 326-332.
Zhu, C., et al, A Novel Split Phase Dual Buck Half Bridge Inverter, 0-7803-8975-1/05/$20.00 c2005 IEEE, pp. 845-849, Aero-Power Sci-Tech Center, Nanjing University of Aeronautics & Astronautics, Nanjing, P.R. China.
Yao, Z., Two-Switch Dual-Buck Grid-Connected Inverter, 978-1-4244-3557-9/09/$25.00 c2009 IEEE, pp. 2182-2187, College of Electrical Engineering, Yancheng Institute of Technology, Yancheng, China.
Wang, Z., et al, Simulation Study of Charge Controlled Half-cycle Modulated Dual Buck Half Bridge Inverter, Nanjing University of Aero. & Astro., College of Automation, Nanjing, China.
Liu, J., et al, A Novel Three Level Dual Buck Half Bridge Inverter, 978-1-4244-1874-9/08/$25.00 c2008 IEEE, pp. 483-487.

* cited by examiner

*Primary Examiner* — Adolf Berhane
(74) *Attorney, Agent, or Firm* — Grasso PLLC; Fred Grasso

(57) ABSTRACT

Reverse recovery avoidance when converting power is provided. A first switch and second switch may be operated to supply an AC load with positive current, respective to the AC load, from a DC power source. A third and fourth switch may be operated to supply the AC load with negative current, respective to the AC load, from the DC power source. Four diodes may be employed with the switches. One diode may conduct the positive current when the first switch is off and the second switch is on. Another diode may conduct the negative current when the third switch is off and the fourth switch is on.

34 Claims, 7 Drawing Sheets

US 8,451,638 B2

POWER CONVERTER WITH REVERSE RECOVERY AVOIDANCE

BACKGROUND OF THE INVENTION

1. Technical Field

This invention relates to power converters, and more specifically to avoiding reverse recovery conditions during power converter operation.

2. Related Art

Typical power converters implement one or more switches to selectively apply a voltage source to an output load. Various power converter configurations may be used such as a half-bridge configuration. Transistors, such as metal-oxide-semiconductor field-effect transistors (MOSFETs) may be used as the switches in the half-bridge arrangements. During operation, internal diodes of some transistors may store electrical charge due to conduction properties of the internal diodes. Electrical current spikes through the transistors may occur due to the stored electrical charge. These electrical current spikes may contribute to a significant amount of power loss through dissipation in the transistors.

SUMMARY

According to one aspect of the disclosure, a power converter may include at least four switches to deliver power from a direct current (DC) power source to an alternating current (AC) load. A first and second switch may be electrically coupled to deliver DC current from a DC power source to an AC load. The first and second switch may deliver current to the AC load positive in polarity with respect to the AC load when the first and second switches are in respective on states. A third and fourth switch may be electrically coupled between the DC source and the AC load to deliver current to the AC load negative in polarity with respect to the load when the third and fourth switches are in respective on states. To avoid reverse recovery conditions during switching, a first diode may block reverse-recovery-causing current from flowing through the fourth switch and a second diode may provide a current path for the reverse-recovery-causing current. The first and second diodes may be used in such a manner when the current is positive with respect to the AC load and the first switch is turned off. Similarly, a third diode may block reverse-recovery-causing current from flowing through the second switch and a fourth diode may provide a current path for the reverse-recovery-causing current. The third and fourth diodes may be used in such a manner when the current is negative with respect to the AC load and the third switch is turned off. In one example, the second and fourth diodes may be Schottky diodes or ultrafast diodes.

A controller may be configured to generate switching signals for each of the switches. The switching frequency of the first switch and third switch may be based on the desired AC load current and on the desired polarity of the output current and an error signal between output current of the power converter and desired AC load current. The switching frequency of the second switch and the fourth switch may be based on the desired polarity of the output current.

BRIEF DESCRIPTION OF THE DRAWINGS

The disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
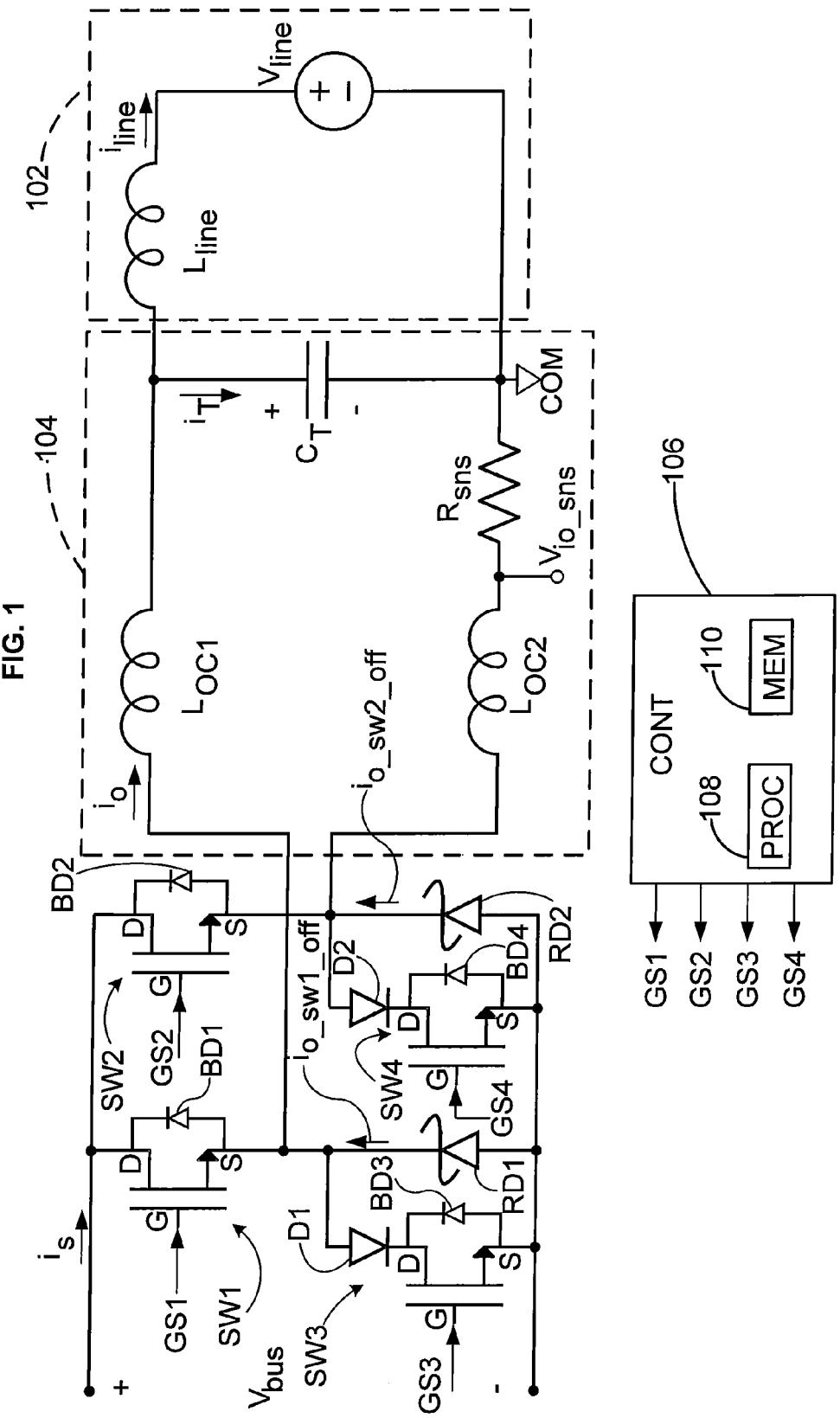
FIG. 1 is a circuit diagram of an example power converter having an energy recovery circuit.

FIG. 1 is a circuit diagram of an example power converter 100. In FIG. 1, the power converter 100 may be configured to convert direct current (DC) power to alternating current (AC) power, and thus, the power converter 100 may be referred to as a DC-AC converter or power inverter. In FIG. 1, the power converter 100 may transfer DC power from a DC voltage source $V_{bus}$, convert the DC power to AC power, and deliver the AC power to an output load 102. In one example, the output load 102 may be an AC power grid, such as that used in electric utilities. In one example, the voltage source $V_{bus}$ may be generated based on a renewable energy source such as solar power, for example. The power converter 100 may be used to convert DC power produced by a DC power source such as a solar power module, including one or more of photovoltaic cells, to AC power and deliver the AC power to the output load 102. In FIG. 1, the output load 102 may be an AC power grid, such as that connected to a residential home, for example. An AC power grid may be represented by an AC voltage source $V_{line}$ and an inductive element $L_{line}$. In other examples, the AC power grid may be represented by other elements such as resistive or capacitive elements, or some combination.

The power converter 100 may deliver an output current $i_o$. At least a portion of the output current $i_o$ may be received by the output load 102. The output current $i_o$ is based on source current $i_s$ provided by the voltage source $V_{bus}$. Because the voltage source $V_{bus}$ provides a DC current, the power converter 100 may invert the DC current (source current $i_s$) with respect to the output load at desired times, in order to provide an appropriate AC current to the output load 102. In one example, the power converter 100 may be configured in an "H-bridge" arrangement to convert the DC power from the voltage source $V_{bus}$ to the output load 102. In FIG. 1, the power converter 100 may include switches SW1 through SW4. In FIG. 1, each switch SW1 through SW4 may be a transistor such as a metal-oxide semiconductor field effect transistor ("MOSFET"). A gate (G), drain (D), and source (S) of each switch SW1 through SW4 is shown in FIG. 1. The term MOSFET may refer to other field effect transistors such as those having a gate material other than metal, such as polysilicon (polycrystalline silicon) or other suitable gate material. The term MOSFET may also include insulated-gate field-effect transistors (IGFETs), as well. Other suitable switch types may be used for SW1 through SW4 for appropriate applications.

The power converter 100 may also include a filter 104 that includes a first filter element $L_{OC1}$ and a second filter element $L_{OC2}$. In other examples, more filter elements may be implemented. In FIG. 1, the filter elements $L_{OC1}$ and $L_{OC2}$ may each be embodied as inductive elements such as one or more inductors. In other examples, other filtering mechanisms may be implemented. The first filter element $L_{OC1}$ may be electrically coupled between the output load 102 and the switch SW1. The second filter element $L_{OC2}$ may be electrically coupled between the output load 102 and the switch SW4. A third filter element $C_T$ may be electrically coupled between the filter elements $L_{OC1}$ and $L_{OC2}$ and in parallel to the output load 102. The third filter element $C_T$ may be a capacitive element, such as one or more capacitors. The filter elements $L_{OC1}$, $L_{OC2}$, and $C_T$ may be used to filter output ripple associate with the output load 102. In alternative examples, a single filter element may be used, such as one or more inductors electrically coupled in series with the output load 102. The power converter 100 may also include a sense resistor $R_{sns}$ electrically coupled between the filter element $L_{OC2}$ and the filter element $C_T$. As later described in detail, the sense resistor $R_{sns}$ may be used to generate a sense voltage $V_{io\_sns}$ used for control of the switches SW1 through SW4. The sense resistor $R_{sns}$ and third filter element $C_T$ may be electrically coupled to a common ground COM. In alternative examples, other circuit elements and/or circuits may be used to sense the output current $i_o$.

The power converter 100 may also include a series diode D1 electrically coupled between the output load 102 and the switch SW3. In FIG. 1, the series diode D1 includes a cathode electrically coupled to the drain of the switch SW3 and an anode electrically coupled to the filter element $L_{OC1}$. Similarly, the power converter 100 may include a second series diode D2 electrically coupled between the output load and the switch SW4. In FIG. 1, the cathode of the series diode D2 is electrically coupled to a drain of the switch SW4 and the anode of the series diode D2 is electrically coupled to the filter element $L_{OC2}$. The power converter 100 may also include recovery diodes RD1 and RD2. As later described in detail, the recovery diodes RD1 and RD2 may contribute to reducing, removing, and/or avoiding conditions associated with causing reverse recovery current within the power converter 100. The recovery diode RD1 may be electrically coupled in parallel to the series diode D1 and the switch SW3. The recovery diode RD2 may be electrically coupled in parallel to the second series diode D2 and the switch SW4. In FIG. 1, the cathodes of the recovery diodes RD1 and RD2 may be electrically coupled to the anodes of the series diodes D1 and D2, respectively. The anodes of the recovery diodes RD1 and RD2 may be electrically coupled to the sources of the switches SW3 and SW4, respectively.

In FIG. 1, each switch SW1 through SW4 may have an "on" state and "off" state. When embodied as FETs, the on and off state of each switch SW1 and SW4 may be based on voltage applied to the gates (G) of each switch SW1 through SW4 through gate signals GS1 through GS4, respectively. In alternative examples, the gates signals GS1 through GS4 may be used to control a variety of suitable switch types. In one example, the gate signals GS1 through GS4 may be generated by controller 106 having a processor 108 in communication with a memory 110. The memory 110 may include one or more memories and may be computer-readable storage media or memories, such as a cache, buffer, RAM, removable media, hard drive or other computer readable storage media. Computer readable storage media may include various types of volatile and nonvolatile storage media. Various processing techniques may be implemented by the processor 108 such as multiprocessing, multitasking, parallel processing and the like, for example. The processor 108 may include one or more processors.

The memory 110 may store software modules executable by the processor 108 to cause the controller 106 to generate the gate signals GS1 through GS4 according to a desired switching strategy. The term "module" may be defined to include a plurality of executable modules. As described herein, the modules are defined to include software, hardware or some combination thereof executable by the processor 108. Software may include instructions stored in the memory 110, or other memory device, that are executable by the processor 108 or other processor. Hardware may include various devices, components, circuits, gates, circuit boards, and the like that are executable, directed, and/or controlled for performance by the processor 108. In other examples, the controller 106 may include analog components, digital components, or both, such as that described with regard to FIGS. 2 and 3.

In order to convert the DC power from the voltage source $V_{bus}$ to AC power, the switches SW1 through SW4 may be operated to provide the appropriate power type and amount. Since the average DC source current $i_s$ is positive with respect to the voltage source $V_{bus}$, the source current $i_s$ may be appropriately routed using switches SW1 through SW4 to provide an AC current relative to the output source 102. For example, a positive current relative to the output load 102 flows into the positive terminal (+) of the AC voltage source $V_{line}$. To supply the output load 102 with a positive polarity current relative to the output load 102, switches SW1 and SW4 may be actively switched and switches SW2 and SW3 are turned off (open) to allow the source current $i_s$ to initially flow through switch SW1 and through the first filter element $L_{OC1}$. Some of the output current $i_o$ may flow through the third filter element $C_T$, providing a line current $i_{line}$ supplied to the output load 102 to be the difference between the output current $i_o$ and a filter current $i_T$. The line current $l_{line}$ flows through the output 102. On the return path, the output current $i_o$ ($i_{line}+i_T$) flows through the sense resistor $R_{sns}$ and the second filter element $L_{OC2}$. The output current $i_o$ then flows through the series diode D2 and the switch SW4 prior to returning to the voltage source $V_{bus}$.

When negative polarity of the output current $i_o$ is desired, the switches SW1 and SW4 may be switched to the respective off states (open) and switches SW2 and SW3 may be switched to the respective on states. This allows the source current $i_s$ to substantially be the output current $i_o$ as it flows through the switch SW2 and through the second filter element $L_{OC2}$ and the sense resistor $R_{sns}$, prior to splitting between $i_T$ and the line current $i_{line}$. The source current $i_s$, as the output current $i_o$, then flows through the first filter element $L_{OC1}$, the series diode D1 and the switch SW3 prior to returning the voltage source $V_{bus}$.

In operation, when providing an output current $i_o$ having a positive polarity, the switches SW1 and SW4 may be switched on. However, to control the amount of power provided to the output load 102, pulse-width-modulation (PWM) control may be used to control the switch SW1. The switch SW4 may be switched on during an entire cycle of desired positive polarity output current $i_o$. In one example, the switch SW4 may be switched to an on state when the output current $i_o$ is desired to have a positive polarity, and thus may have a switching frequency in accordance with a fundamental frequency of the desired AC output current $i_o$, such as 60 Hz as found in most United States power grids. In a similar manner, when the output current $i_o$ is desired to have a negative polarity relative to the output load 102, the switch SW3 may be switched at the desired fundamental frequency of the desired output current and the switch SW2 may be switched using PWM to provide the desired amount of power to output load. The PWM switching strategy may be performed at a relatively much higher switching frequency such as 20-100 kHz. The switch SW1 may have a variable duty cycle to control the amount of power provided to the output load 102. Due to the inductive nature of the output load 102, current continues to flow through the power converter 100 to the output load 102 even when the switch SW1 is turned off for a relatively short time. Thus, the output current $i_o$ flowing through the power converter 100 may require a conductive path when the switch SW1 is off.

The converter arrangement of FIG. 1 without the series diodes D1 and D2 and the recovery diodes RD1 and RD2 being present, in operation, may result in destructive conditions such as shoot-through current due to reverse recovery conditions. For example, such a configuration, while positive polarity current is being supplied to the output load 102, switch SW1 may be switched on and off switched using PWM or any other switching strategy. During switching, when the switch SW1 is turned off, current flowing to the output load 102 requires a path but is unable to flow through SW1 while turned off.

As shown in FIG. 1, each switch SW1 through SW4 may include an internal body diode BD1 through BD4, respectively, such as those found in MOSFETs. Each body diode BD1 through BD4 may conduct current even when the respective switch SW1 through SW4 is turned off. Thus, in a traditional H-bridge arrangement, as switch SW1 is turned off while positive polarity current is being supplied to the output load 102, the body diode BD3 will conduct the output current $i_o$ until SW1 is turned on. However, as the body diode BD3 conducts the output current $i_o$, the body diode BD3 stores charge. As a consequence, when the switch SW1 is turned on again the charge stored in the body diode BD3 will be discharged resulting in a spike in current flowing through the switch SW1 and the body diode BD3 causing a significant and undesired expenditure of power in SW1 with each turn on during such operation. Similarly, body diode BD4 may conduct current when negative polarity current is being delivered to the output load 102 and switch SW2 is turned off causing reverse recovery current to occur when the switch SW2 is turned on again.

In FIG. 1, the power converter 100 is configured to reduce reverse recovery current. During operation, when switches SW1 and SW4 are cooperatively operating to provide positive polarity current, the source current $i_s$, which is also substantially the output current $i_o$ at this time, which flows through both switches SW1 and SW4. When SW1 is turned off while positive polarity current is being delivered to the output load 102, the flow of the output current $i_o$ requires a path. In FIG. 1, the output current $i_o$ is blocked from flowing through the body diode BD3 by the series diode D1 forcing the current to flow through the reverse recovery diode RD1, indicated as $i_{o\_sw1\_off}$. Similarly, when switches SW2 and SW3 are cooperatively operating to provide negative polarity current, SW2 may experience off states during PWM control. The output current $i_o$ will flow through the recovery diode RD2 (indicated as $i_{o\_sw2\_off}$) due to series diode D2 blocking the output current $i_o$ from flowing through the body diode BD4.

In one example, the recovery diodes RD1 and RD2 may be high voltage diodes since they must block the full DC voltage from $V_{bus}$. In one example, the recovery diodes RD1 and RD2 may be SiC Schottky diodes. Schottky diodes typically do not display reverse recovery characteristics, and thus store little to no charge when conducting. As a result, in FIG. 1, when SW1 is turned off, positive polarity current flows through the recovery diode RD1 and when switch SW1 is turned back on, there is little to no charge stored in the recovery diode RD1 to cause significant reverse recovery current. Similarly, the recovery diode RD2 alleviates reverse recovery conditions when switch SW2 is turned on and off while negative polarity current is being delivered to the output load 102. In other examples, diodes having substantially no reverse recovery characteristics, such as accumulating nominal charge during current conduction, may be used as the recovery diodes RD1 and RD2.

Figure 2:
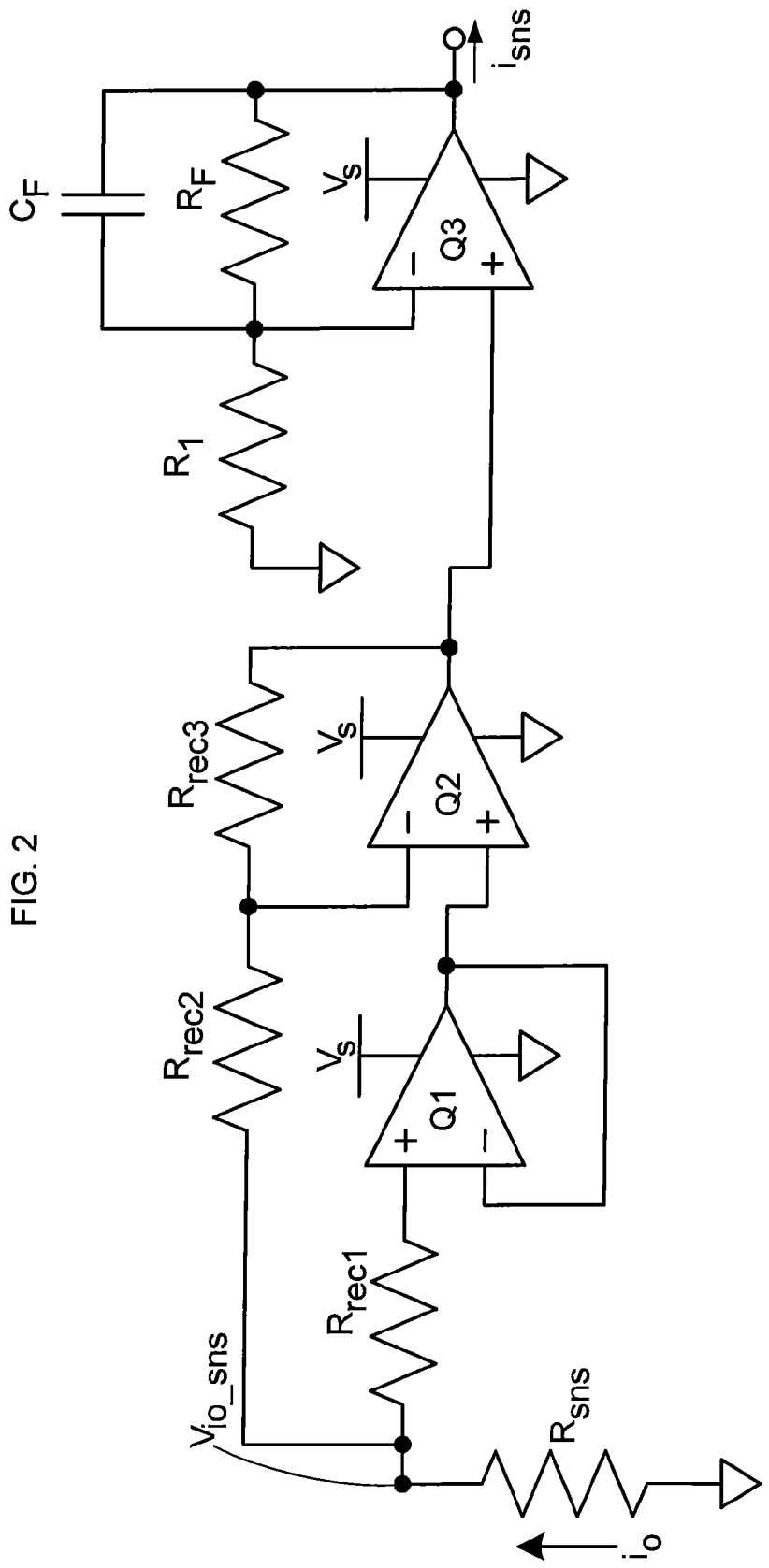
FIG. 2 is a circuit diagram of a portion of an example controller for the power converter of FIG. 1.
Figure 3:
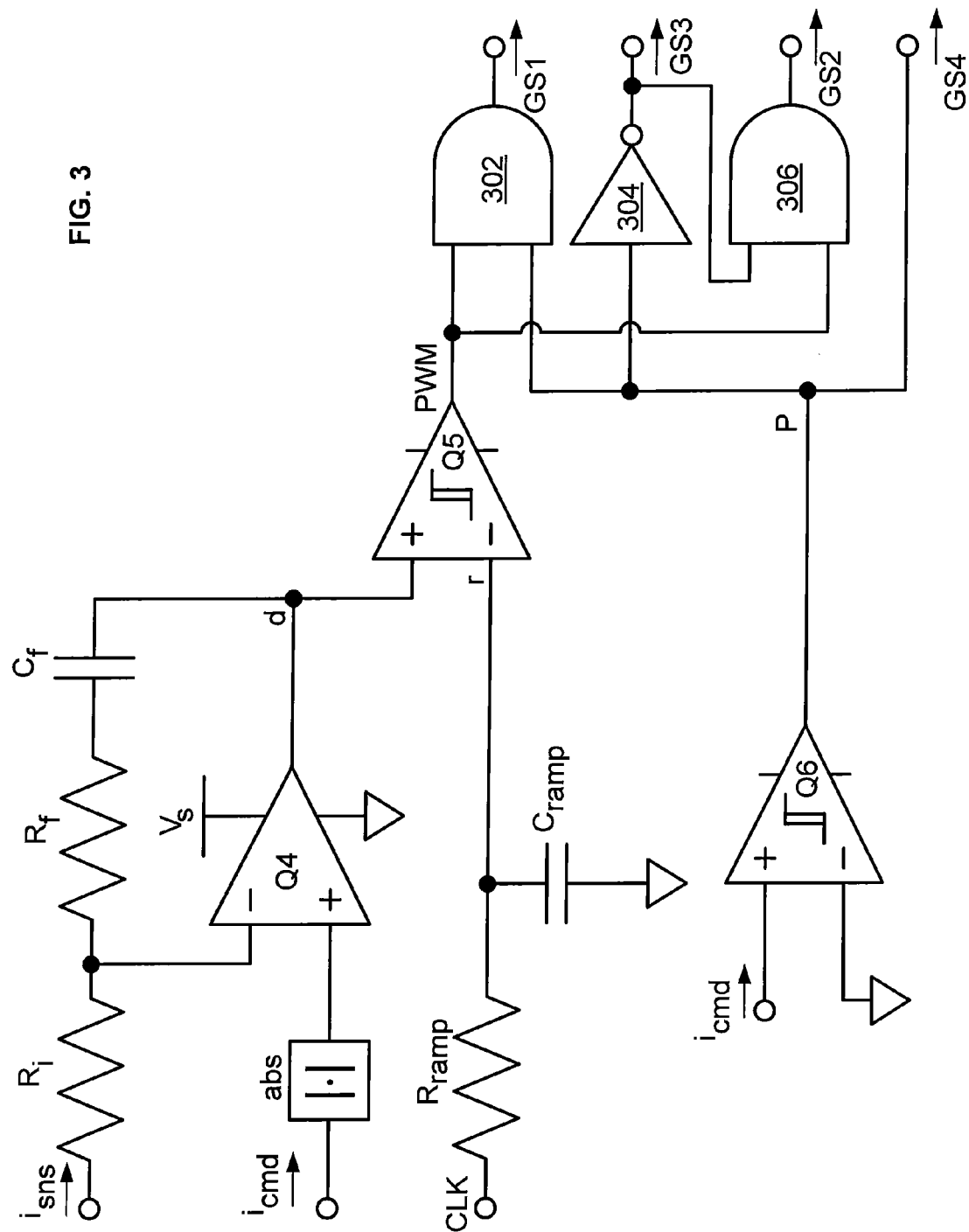
FIG. 3 is a circuit diagram of another portion of the example controller of FIG. 2.

FIGS. 2 and 3 show an example control circuit configured to generate the gate signals GS1 through GS4. FIGS. 2 and 3 show the control circuit 200 as including hardware components. However, in other examples, the control circuit 200 may be embodied as software or a combination of software and hardware modules. FIG. 2 shows a circuit schematic of a portion of the control circuit 200 configured to rectify and amplify the sense voltage $V_{io\_sns}$. In FIG. 2, the sense voltage $v_{io\_sns}$ may be provided to a resistive element $R_{rec1}$ electrically coupled to the non-inverting input of operational amplifier (op-amp) Q1. The inverting input of the op-amp Q1 may be electrically coupled to the output of the op-amp Q1. The output of the op-amp Q1 may be electrically coupled to a non-inverting input of op-amp Q2. An inverting input of the op-amp Q2 may be electrically coupled between the resistive element $R_{rec2}$ and a resistive element $R_{rec3}$. In one example, the resistive elements $R_{rec1}$, $R_{rec2}$, and $R_{rec3}$ may have approximately the same resistance.

The output of op-amp Q2 is electrically coupled to the resistive element $R_{rec3}$ and a non-inverting input of an op-amp Q3. An inverting input of the op-amp Q3 is electrically coupled to a resistive element $R_1$, a resistive element RF, and a capacitive element $C_F$. The resistive element $R_1$ may also be coupled to ground. The output of the op-amp Q3 may be electrically coupled to the resistive element $R_F$ and the capacitive element $C_F$. The output of the op-amp Q3 may provide a sense current $i_{sns}$ indicative of the instantaneous value of output current $i_o$. Each of the op-amps Q1, Q2, and Q3 may be connected to a common voltage source $V_s$ or different voltage sources configured to provide an adequate voltage for appropriate operation.

FIG. 3 is a circuit schematic of another portion of the control circuit 200 used to generate gate signals GS1 through GS4. The driver circuit includes a comparison op-amp Q4. The comparison op-amp Q4 includes an inverting input electrically coupled between resistive elements $R_i$ and $R_f$. The resistive element $R_i$ is configured to receive the sense current $i_{sns}$ and provide a voltage to the non-inverting input of the comparison op-amp Q4 indicative of the sense current $i_{sns}$. The resistive element $R_f$ is electrically coupled to a capacitive element $C_f$, which is also electrically coupled to an output of the comparison op-amp Q4. A commanded current signal $i_{cmd}$ is provided to an absolute value module ("abs") 300 to provide the absolute value of the commanded current signal $i_{cmd}$ to a non-inverting input of the comparison op-amp Q4. The commanded current $i_{cmd}$ may be a command signal generated from a controller, such as the controller 106 and indicative of the current desired to be provided to the output load 102. The comparison op-amp Q4 may also be connected to the common voltage source Vs or be connected to another appropriate voltage source for operation.

The comparison op-amp Q4 performs a comparison of the sense current $i_{sns}$ and the absolute value of the commanded current signal $i_{cmd}$ to generate an error signal "d" representing the duty cycle ratio command used to generate PWM control signals. The error signal d may be supplied to a non-inverting input of a control signal comparator Q5. A ramp signal r may be generated based on a clock signal CLK received by a resistive element $R_{ramp}$ electrically coupled to a capacitive element $C_{ramp}$ and an inverting input of the control signal comparator Q5. The frequency of the clock signal CLK may be based on a desired switching frequency of the switches SW1 and SW2, such as about 50 kHz. Other clock signal CLK frequencies may be used such as frequencies with the range of 20 kHz-100 kHz for example.

An output signal PWM of the control signal comparator Q5 may signal when the switches SW1 and SW2 should be switched. Thus, the on times for the switches SW1 and SW2 is based on the duty cycle of the output signal PWM. For example, the output signal PWM may provide a non-zero voltage when the error signal d is greater than the ramp signal r and may provide an approximately zero voltage when the error signal d is less than the ramp signal r. However, in order to use the switches SW1 and SW2 to provide positive polarity and negative polarity current to the output load 102, the switch SW1 may be turned on when the current supplied to the output load 102 is desired to be of positive polarity. Similarly, the switch SW2 may be turned on when the current supplied to the output load 102 is desired to be of negative polarity. Thus, the control circuit 200 includes a polarity comparator Q6 configured to receive the commanded current signal $i_{cmd}$ at its non-inverting input and have its inverting input grounded. As a result, a polarity output signal p of the polarity comparator Q6 indicates the desired polarity of the output current. For example, when the commanded current signal $i_{cmd}$ is greater than zero, the output signal p of the polarity op-amp is a non-zero voltage. When the commanded current signal $i_{cmd}$ is less than or equal to zero, the output signal p is approximately zero volts.

As described, the outputs of comparators Q5 and Q6 may be a non-zero voltage or approximately zero volts, depending on the respective input signals allowing the outputs of comparators Q5 and Q6 to act as logic signals to be implemented in controlling gate signals GS1 through GS4. In FIG. 3, the output signals PWM and p may be provided to an "AND" gate 302. The output of the AND gate 302 may be the gate signal GS1. The gate signal GS1 provides a gate voltage to the switch SW1 when both output signals PWM and p are "high" logic signals indicating that, based on the duty cycle, the voltage source $V_{bus}$ should be applied to the output load 102 and the desired current is positive in polarity. The output p of the comparator Q6 is the gate signal for switch SW4, which should be turned on when the desired current is greater than zero. The output signal p is inverted by an inverter 304 to generate the gate signal GS3. The gate signal GS3 should turn on the switch SW3 when the desired current is zero or less, and thus, is the inverse of the gate signal GS4. The last gate signal, GS2, should turn on the switch SW2 when the duty cycle indicates the voltage source $V_{bus}$ should be applied to the output load 102 and the desired current is negative in polarity. To accomplish this, the gate signal GS2 may be an output of an AND gate 306 having the output signal PWM and the inverted output signal p, the gate signal GS3, as inputs.

FIGS. 4-7 show voltages and currents associated with operation of the power converter 100 based on the component values in Table 1. In other examples, other component configurations and components sizes could be used to provide similar functionality.

TABLE 1

| | | | | | | | | |
|---|---|---|---|---|---|---|---|---|
| $L_{OC1}$ | 3 mH | $V_s$ | 3.3 V | $R_F$ | 48.7 kΩ | $R_{ramp}$ | | 10 kΩ |
| $L_{OC2}$ | 3 mH | $R_{rec1}$ | 1 kΩ | $C_F$ | 33 pF | $C_{ramp}$ | | 1 nF |
| $C_T$ | 330 nF | $R_{rec2}$ | 1 kΩ | $R_i$ | 54.9 kΩ | Switching Frequency | | 20 kHz |
| $L_{line}$ | 1.25 mH | $R_{rec23}$ | 1 kΩ | $R_f$ | 30.1 kΩ | | | |
| $R_{sns}$ | 0.02 Ω | $R_1$ | 1 kΩ | $C_f$ | 1 nF | | | |

Figure 4:
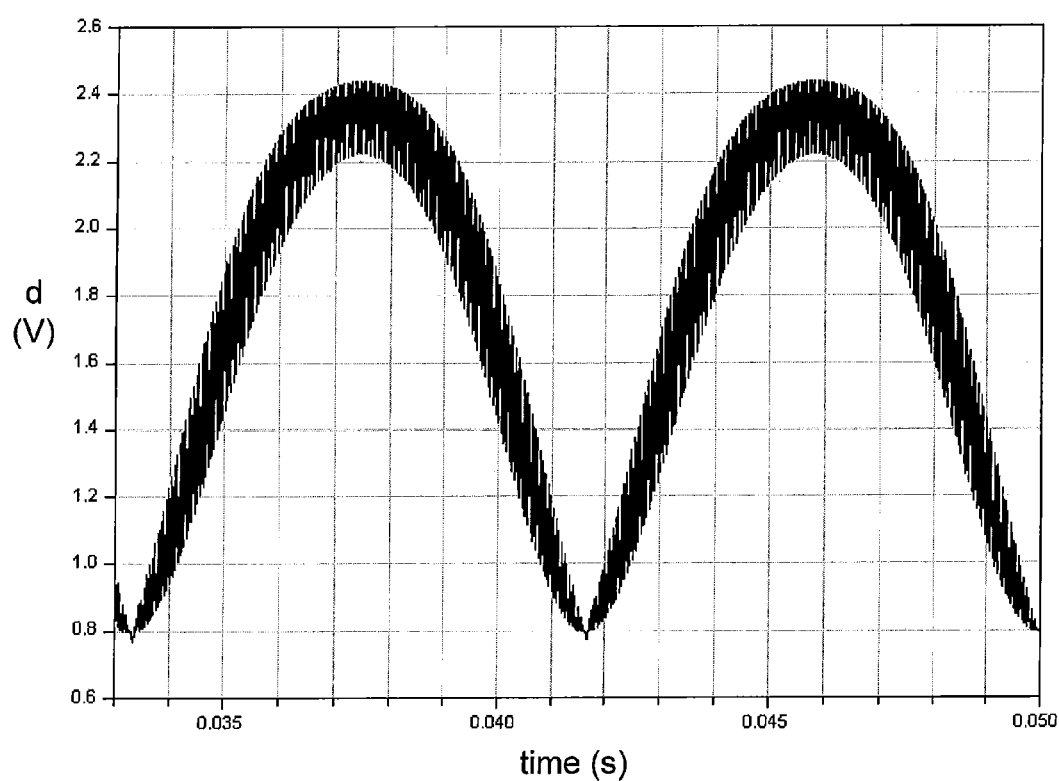
FIG. 4 is a plot of an error signal versus time during operation of the example power converter of FIG. 1.
Figure 5:
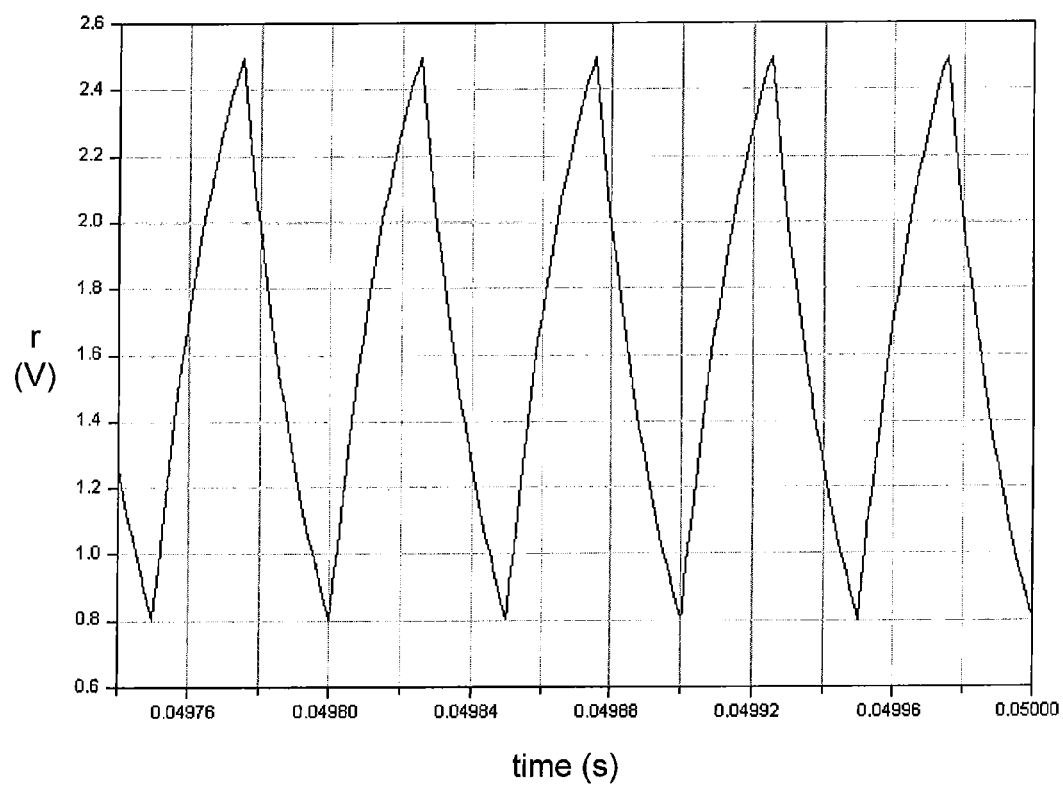
FIG. 5 is a plot of a ramp signal versus time during operation of the example power converter of FIG. 1.
Figure 6:
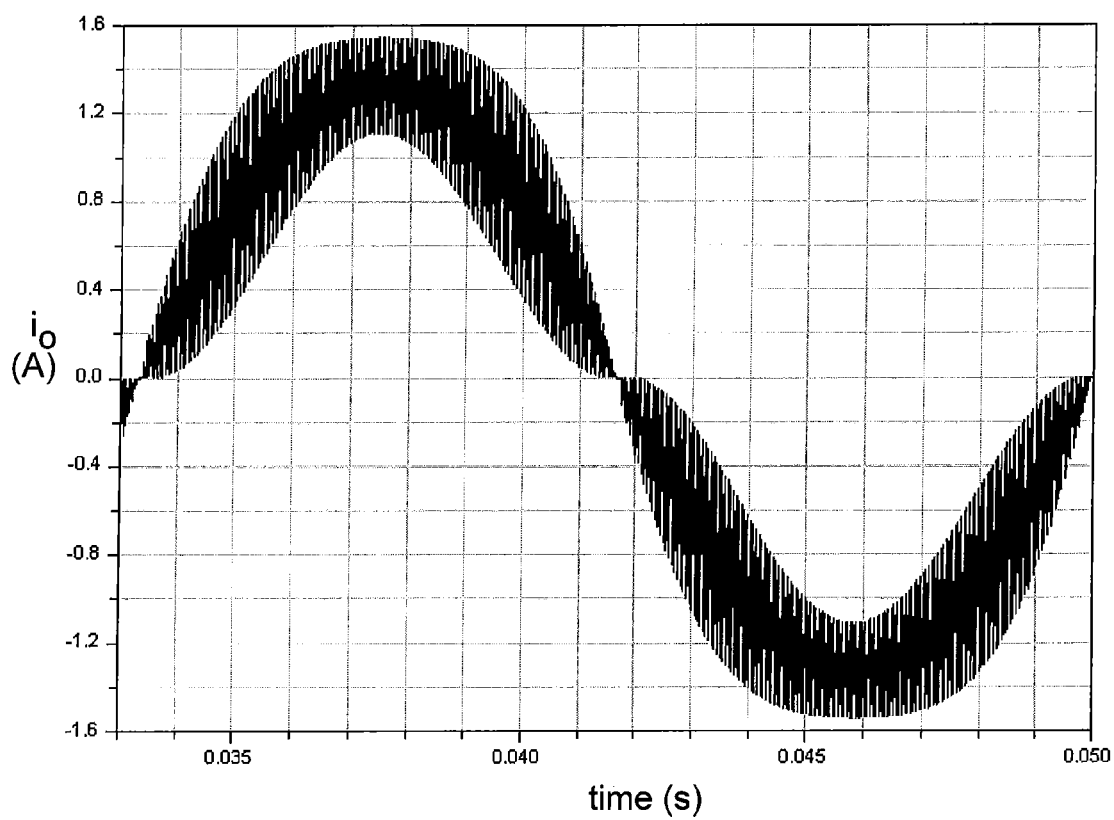
FIG. 6 is a plot of an output current versus time during operation of the example power converter of FIG. 1.
Figure 7:
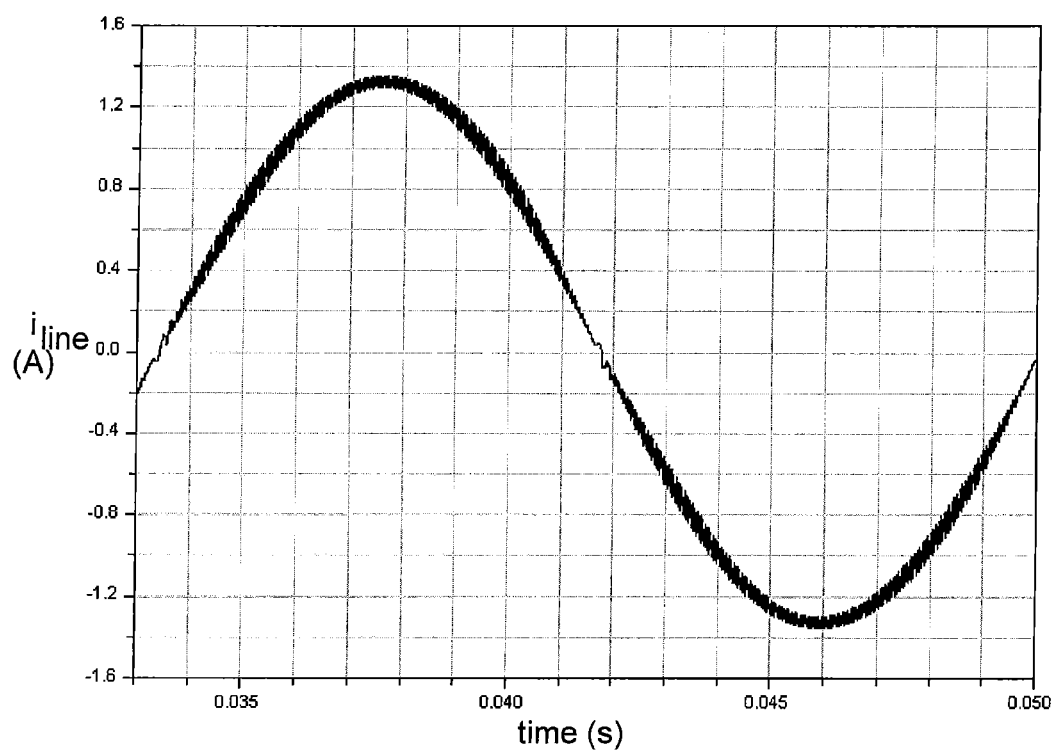
FIG. 7 is filtered a plot of the output current of FIG. 6 filtered versus time.

FIG. 4 is a plot of an example error signal d versus time. FIG. 5 is a plot of an example ramp signal r versus time. FIG. 6 is a plot of the output current $i_o$ versus time. FIG. 7 is a plot of an example output load current $i_{line}$ versus time.

While various embodiments of the invention have been described, it will be apparent to those of ordinary skill in the art that many more embodiments and implementations are possible within the scope of the invention. The various embodiments described herein include a variety of electrical elements and combinations of electrical elements, such as inductors, capacitors, voltage sources, switches, resistors, diodes, and power converters electrically coupled in various manners. The described example configurations of electrical elements and devices are examples that may be embodied through equivalent configurations having additional or fewer of the described elements, circuits, and devices, and alternative elements, alternative circuits, and/or alternative devices while remaining within the scope of invention. Accordingly, the invention is not to be restricted except in light of the attached claims and their equivalents.

We claim:

1. A power converter configured to transfer power between a direct current (DC) voltage source and an alternating current (AC) load, the power converter comprising:
   a first switch electrically coupled to a DC voltage source;
   a second switch electrically coupled to the DC voltage source;
   a third switch electrically coupled to the DC voltage source;
   a fourth switch electrically coupled to the DC voltage source;
   a first series diode coupled to the third switch and an AC load;
   a second series diode coupled to the fourth switch and the AC load;
   a first recovery diode electrically coupled in parallel to the first series diode and the third switch, and configured to conduct an output current when the first switch is in an "off" state; and
   a second recovery diode electrically coupled in parallel to the second series diode and the fourth switch, and configured to conduct the output current when the second switch is in an "off" state.

2. The power converter of claim 1, wherein the first recovery diode is configured to conduct the output current during a positive polarity current state of the power converter.

3. The power converter of claim 1, wherein the second recovery diode is configured to conduct the output current during a negative polarity current state of the power converter.

4. The power converter of claim 1, wherein the third switch includes a body diode configured to conduct the output current when the first switch is in an "on" state.

5. The power converter of claim 1, wherein the fourth switch includes a body diode configured to conduct the output current when the second switch is in an "on" state.

6. The power converter of claim 1, wherein at least the first switch or the second switch is configured to be switched at a first switching frequency and wherein at least the third switch or the fourth switch is configured to be switched at a second switching frequency, the second switching frequency different from the first switching frequency.

7. The power converter of claim 1, wherein one or more recovery diodes is a Schottky diode and wherein the four switches are directly coupled to the DC voltage source.

8. The power converter of claim 1, wherein the DC voltage source is a renewable energy source and wherein the four switches are indirectly coupled to the DC voltage source.

9. The power converter of claim 1 wherein the DC voltage source is a PhotoVoltaic and wherein the AC load is an AC power grid.

10. The power converter of claim 6 wherein the first switching frequency is based upon a target AC load current and on a target polarity of output current and on an error signal metering between output current of the power converter and the target AC load current.

11. The power converter of claim 1, wherein one or more recovery diodes is a Schottky diode.

12. A method for reducing reverse recovery current in a power converter, the method comprising:
   supplying an output current from at least one of a first switch, a second switch, a third switch, and a fourth switch to an output load;
   when the first switch is in an "on" state, flowing the output current back to a voltage source through a first series diode electrically connected to the third switch;
   when the first switch is in an "off" state, flowing the output current back to the voltage source through a first recovery diode electrically coupled in parallel to the third switch and the first series diode;
   when the second switch is in the "on" state, flowing the output current back to the voltage source through a second series diode electrically connected to the fourth switch; and
   when the second switch is in an "off" state, flowing the output current back to the voltage source through a second recovery diode electrically coupled in parallel to the fourth switch and the second series diode.

13. The method of claim 12 further comprising:
switching the first switch and the fourth switch to provide the output current having a positive polarity.

14. The method of claim 12 further comprising:
switching the second switch and the third switch to provide the output current having a negative polarity.

15. The method of claim 12 further comprising:
switching the first switch or the second switch at a first frequency and switching the third switch or the fourth switch at a second frequency, the second frequency different from the first frequency.

16. The method of claim 12, wherein output current flowing back to the voltage source passes substantially solely through a doide.

17. The method of claim 12, wherein output current flows back to the voltage source without passing through intervening switches or other components.

18. The method of claim 12 further comprising:
splitting the output current in a filter coupled between the switches and the output load into a line current and a filter current, wherein the line current flows to the output load.

19. The method of claim 12 further comprising:
measuring the output current to control the switches.

20. The method of claim 19 further comprising:
generating a sense voltage to determine a value for the output current.

21. The method of claim 12 further comprising:
when the first switch is in the "off" state, blocking substantially all of the output current from flowing through a body diode of the third switch with the first series diode.

22. The method of claim 12 further comprising:
when the second switch is in the "off" state, blocking substantially all the output current flowing through a body diode of the fourth switch with the second series diode.

23. The method of claim 12 further comprising:
generating switching signals for at least the first, second, third, and fourth, switches with a controller.

24. A power converter comprising:
a first switching means for delivering output current to an output load;
a blocking means for preventing flow of the output current through a switch of the switching means during a first state of the switching means;
a recovery means for providing flow of the output current through a recovery diode during the first state of the switching means; and
a conducting means to conduct the output current through the switch during a second state of the switching means.

25. The power converter of claim 24, wherein the recovery means is coupled in parallel to the switch and the blocking means.

26. The power converter of claim 24 further comprising:
a controller to switch the switching means from the first state to the second state and,
   wherein the blocking means prevents all flow of the output current through a switch of the switching means during a first state of the switching means.

27. An article of manufacture comprising:
nontransient computer readable medium storing instructions, which when executed cause a controller to carry-out control operations for reducing reverse recovery current in a power converter, the control operations comprising:
supplying an output current from at least one of a first switch, a second switch, a third switch, and a fourth switch to an output load;
when the first switch is in an "on" state, flowing the output current back to a voltage source through a first series diode electrically connected to the third switch;
when the first switch is in an "off" state, flowing the output current back to the voltage source through a first recovery diode electrically coupled in parallel to the third switch and the first series diode;
when the second switch is in the "on" state, flowing the output current back to the voltage source through a second series diode electrically connected to the fourth switch; and
when the second switch is in an "off" state, flowing the output current back to the voltage source through a second recovery diode electrically coupled in parallel to the fourth switch and the second series diode.

28. The article of manufacture of claim 27 wherein the stored instructions, which when executed, cause the controller to carryout further control operations comprising:
switching the first switch and the fourth switch to provide the output current having a positive polarity.

29. The article of manufacture of claim 27 wherein the stored instructions, which when executed, cause the controller to carryout further control operations comprising:
switching the second switch and the third switch to provide the output current having a negative polarity.

30. The article of manufacture of claim 27 wherein the stored instructions, which when executed, cause the controller to carryout further control operations comprising:
switching the first switch or the second switch at a first frequency and switching the third switch or the fourth switch at a second frequency, the second frequency different from the first frequency.

31. The article of manufacture of claim 27 wherein the stored instructions, which when executed, cause the controller to carryout further control operations comprising:
measuring the output current to control the switches.

32. The article of manufacture of claim 27 wherein the stored instructions, which when executed, cause the controller to carryout further control operations comprising:
generating a sense voltage to determine a value for the output current.

33. The article of manufacture of claim 27 wherein the stored instructions, which when executed, cause the controller to carryout further control operations comprising:
when the first switch is in the "off" state, blocking substantially all of the output current from flowing through a body diode of the third switch with the first series diode.

34. The article of manufacture of claim 27 wherein the stored instructions, which when executed, cause the controller to carryout further control operations comprising:
when the second switch is in the "off" state, blocking substantially all the output current flowing through a body diode of the fourth switch with the second series diode.

* * * * *